US007693161B2

(12) United States Patent
Sung

(10) Patent No.: US 7,693,161 B2
(45) Date of Patent: Apr. 6, 2010

(54) NETWORK DEVICE TO SUPPORT SERVICES ACCORDING TO QUALITY OF SERVICE, NETWORK SYSTEM AND METHOD USING THE SAME

(75) Inventor: Min-young Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1016 days.

(21) Appl. No.: 10/924,989

(22) Filed: Aug. 25, 2004

(65) Prior Publication Data
US 2005/0058066 A1 Mar. 17, 2005

(30) Foreign Application Priority Data
Sep. 16, 2003 (KR) .................. 10-2003-0064092

(51) Int. Cl.
*H04L 12/28* (2006.01)
*G06F 15/173* (2006.01)
(52) U.S. Cl. ........................ 370/401; 709/224
(58) Field of Classification Search ............. 370/241.1, 370/395.2, 395.21, 395.5, 401, 463, 252, 370/253, 254; 709/220–229, 250
See application file for complete search history.

(56) References Cited

U.S. PATENT DOCUMENTS

| 6,571,277 | B1 | 5/2003 | Daniels-Barnes et al. | |
| 6,665,705 | B1 * | 12/2003 | Daniels-Barnes et al. | ... 709/203 |
| 2002/0035621 | A1 * | 3/2002 | Zintel et al. | ............... 709/220 |
| 2002/0061024 | A1 * | 5/2002 | Malkemes et al. | ......... 370/401 |
| 2002/0083143 | A1 | 6/2002 | Cheng | |
| 2003/0005130 | A1 * | 1/2003 | Cheng | ........................ 709/228 |
| 2003/0105854 | A1 * | 6/2003 | Thorsteinsson et al. | ..... 709/223 |
| 2003/0182233 | A1 * | 9/2003 | Mocek et al. | .................. 705/51 |

(Continued)

FOREIGN PATENT DOCUMENTS

JP 04-319900 A 10/1992

(Continued)

OTHER PUBLICATIONS

Bao Lei et al. (QoS Residential Gateway. Local Computer Networks, 2002. Proceedings. LCN 2002 27th Annual IEEE Conference on Nov. 6-8, 2002, pp. 518-524).*

(Continued)

*Primary Examiner*—Aung S Moe
*Assistant Examiner*—Redentor M Pasia
(74) *Attorney, Agent, or Firm*—Sughrue Mion, PLLC

(57) ABSTRACT

A control device by which a priority for service is assigned based on quality of service (QoS) for each control point residing on a network and services are provided according to the assigned priority. The control device includes communication S/W module which receives control messages transmitted from the control points or transmits reply messages to the control points, a priority management module which determines the priority for service based on a QoS level for each control point, a UPnP S/W module which analyzes the control messages received from the communication S/W module and controls service operations corresponding to the analyzed control messages, and a service S/W module which performs the service operations under the control of the UPnP S/W module. Consistent with the present invention, the priority for service is assigned according to the QoS for the control point and the services are provided according to the assigned priority.

16 Claims, 5 Drawing Sheets

U.S. PATENT DOCUMENTS

| | | | |
|---|---|---|---|
| 2004/0047310 A1* | 3/2004 | Chen et al. | 370/329 |
| 2004/0090984 A1* | 5/2004 | Saint-Hilaire et al. | 370/463 |
| 2004/0133896 A1* | 7/2004 | Lym et al. | 719/315 |
| 2007/0206615 A1* | 9/2007 | Plamondon et al. | 370/401 |
| 2007/0211632 A1* | 9/2007 | Song et al. | 370/230 |

FOREIGN PATENT DOCUMENTS

| | | |
|---|---|---|
| JP | 09-008804 A | 10/1997 |
| JP | 2001-359209 A | 12/2001 |
| KR | 2002-0064847 A | 8/2002 |
| KR | 2003-28574 A | 4/2003 |
| KR | 2003-0065058 A | 8/2003 |

OTHER PUBLICATIONS

Bao Lei et al:, "QoS-aware residential gateway", Local Computer Networks, 2002. Proceedings. LCN 2002. 27th Annual IEEE Conference on Nov. 6-8, 2002, Piscataway, NJ, USA, IEEE, Nov. 6, 2002, pp. 518-524, XP010628207.

T. Iwao, T. Amamiya, G. Zhong, M. Amamiya, "Ubiquitous computing with service adaptation using peer-to-peer communication framework", Distributed computing systems, 2003. FTDCS 2003. Proceedings. The Ninth IEEE Workshop on Future Trends of, May 28, 2003, pp. 240-248.

Bao Lei, A.L. Ananda and Tan Sun Teck; "QoS-aware Residential Gateway", LCN 2002, 27th Annual IEEE Conference on Local Computer Networks; Nov. 6-8, 2002 , pp. 518-524.

* cited by examiner

FIG. 4

| S/W module | Priority | Description |
|---|---|---|
| Listener | 10 | Includes TCP connection functions, network card control functions and the like, and is processed with a very high priority |
| State monitor | 10 | Detects changes of state of devices |
| Worker | 2 ~ 9 | Is responsible for analyzing the requests from CPs and transmitting reply messages, and its priority for service is determined according to the QoS level of CPs |
| Service process | 2 ~ 9 | Executes the requested services, and its priority is determined according to the QoS level of CPs |
| Event | 2 ~ 9 | Notifies change of state of devices to CPs, and its priority is determined according to the QoS level of CPs |

NETWORK DEVICE TO SUPPORT SERVICES ACCORDING TO QUALITY OF SERVICE, NETWORK SYSTEM AND METHOD USING THE SAME

This application claims priority of Korean Patent Application No. 10-2003-0064092 filed on Sep. 16, 2003 in the Korean Intellectual Property Office, the disclosure of which is incorporated herein in its entirety by reference.

BACKGROUND OF THE INVENTION

1. Field of the Invention

The present invention relates to a network device, network system and method for enabling service support according to quality of service (hereinafter referred to as "QoS"). More specifically, the present invention relates to a network device, network system and method for enabling service support according to QoS, wherein priority for service is assigned according to the QoS for a control point and appropriate services are provided according to the assigned priority.

2. Description of the Related Art

FIG. 1 is a diagram schematically illustrating the configuration of a related Universal Plug and Play (UPnP) system which comprises a UPnP control point 20 and a UPnP control device 10.

The UPnP control point 20 is configured to control the control device 10 and may correspond to, for example, a digital TV 21, a personal computer 22, a PDA (Personal Digital Assistant) 24, a notebook computer 23, or the like.

The UPnP control device 10 provides services using UPnP and may correspond to, for example, a set-top box for playing back and transmitting motion pictures over a network. The UPnP control device 10 comprises a communication software (S/W) module 11, a UPnP S/W module 12 and a service SW module 13.

The communication S/W module 11 functions to receive request data transmitted over a network from the UPnP control point 20 or to transmit reply data to the UPnP control point 20. The UPnP S/W module 12 analyzes the request data to activate the service S/W module 13 or creates reply data and transfers the created reply data to the communication S/W module 11. Further, the UPnP SW module 12 functions to transmit an event message to the UPnP control point 20 when the state of the control device 10 is changed. In addition, the service SW module 13 corresponds to software for providing inherent functions of the control device 10, and decrypts motion pictures to produce picture images in the case of a set-top box, for example.

The operation of the UPnP system will be now described. When control data are transmitted from the UPnP control point 20, the communication S/W module 11 receives the control data. Since Transmission Control Protocol (TCP) is generally employed for data communications in the UPnP system, the communication S/W module 11 includes a TCP connection function.

The received data are transferred to the UPnP S/W module 12. Here, since commands and response data are in Extensible Markup Language (XML) format, the UPnP S/W module 12 analyzes the XML data to activate the requested service via the service S/W module 13.

Then, when the service is provided, the UPnP S/W module 12 generates the result of the service in XML format and transmits the created result to the UPnP control point 20.

That is, the UPnP system processes the tasks requiring intensive computation such as XML analysis, TCP connection, HTTP handling and Java, and also performs a variety of incidental functions of notifying the presence of the UPnP control device 10, checking a change of state of the UPnP control device 10 and the like, in addition to the function of controlling the UPnP control device 10 directly related to the service.

However, each of the UPnP control devices 10 of a home network generally includes a CPU with relatively lower performance than general-purpose computing platforms such as PCs. Thus, the operational overhead of the UPnP system is increased as the number of UPnP-enabled control points 20 is increased.

For example, if a digital TV 21 for receiving motion pictures from a set-top box and outputting them to a screen is further provided, the image output from the digital TV 21 can be subject to interference due to the control commands transmitted from other associated output devices such as a PC 22, a notebook computer 23 and a PDA 24. In the worst case, there is a problem in that the satisfaction level of a user may be decreased due to intermittent display, increased control time and the like.

Therefore, to prevent inconvenience to the user due to contentions between a plurality of UPnP control points 20, there is a need for a network system and method for enabling service support according to quality of service (QoS) wherein a predetermined QoS level is assigned to each of the UPnP control points 20 and priority according to the QoS is assigned to the UPnP control device 10.

SUMMARY OF THE INVENTION

Accordingly, the present invention addresses the aforementioned inconveniences. An aspect of the present invention is to provide a network device, network system and method for enabling service support according to quality of service (QoS), wherein priority for service is assigned according to the QoS for a control point and appropriate services are provided according to the assigned priority.

Consistent with an exemplary embodiment of the present invention for achieving the above aspect, there is provided a control device by which a priority for service is assigned based on quality of service (QoS) for each control point residing on a network and services are provided according to the assigned priority.

In an exemplary embodiment, the control device comprises a communication S/W module which receives control messages transmitted from the control points or transmits reply messages to the control points, a priority management module which determines the priority for service based on a QoS level for each control point, a UPnP S/W module which analyzes the control messages received from the communication S/W module and controls service operations corresponding to the analyzed control messages, and a service S/W module which performs the service operations under the control of the UPnP S/W module.

Further, in an exemplary embodiment, the priority management module determines the priority for service using a mapped table in which the QoS is stored for each control point.

Further, in an exemplary embodiment, the UPnP S/W module checks a change of state of the network device to be controlled and creates an event in response to the checked result.

In an exemplary embodiment, the UPnP S/W module may be divided according to execution unit.

Consistent with another exemplary embodiment of the present invention, there is provided a network system for enabling service support according to quality of service (QoS), comprising a control point for controlling the operations of devices residing on a network and a control device for assigning a priority for service according to the QoS for each control point and providing services according to the assigned priority for service.

Consistent with a further exemplary embodiment of the present invention, there is provided a method for enabling service support according to quality of service (QoS), comprising the steps of (1) receiving a control message transmitted from a control point, (2) determining a priority for service based on a QoS level for the control point that has transmitted the received control message, and (3) providing relevant services according to the determined priority for service.

In an exemplary embodiment, the step (2) comprises the step of determining the priority for service using a mapped table in which the QoS is stored for each control point.

In an exemplary embodiment, the step (3) comprises the steps of analyzing the control message transmitted from the control point, and activating services corresponding to the analyzed message according to the priority for service.

In an exemplary embodiment, the method of the present invention further comprises the steps of checking a change of state of the control device, and notifying the control point of information on the state of the detected control device according to the priority for service, when it is checked that the change of state is detected.

Consistent with a still further exemplary embodiment of the present invention, there is provided a method for enabling service support according to quality of service (QoS), comprising the steps of (1) transmitting a control message to a control device by a control point, (2) determining a priority for service based on a QoS level for the control point that has transmitted the received control message, and (3) providing relevant services according to the determined priority for service.

In an exemplary embodiment, the step (2) comprises the step of determining the priority for service using a mapped table in which the QoS is stored for each control point.

Consistent with an exemplary embodiment, the step (3) comprises the steps of analyzing the control message transmitted from the control point, and activating services corresponding to the analyzed message according to the priority for service.

Consistent with an exemplary embodiment, the method of the present invention further comprises the steps of checking a change of state of the control device, and notifying the control point of information on the state of the detected control device according to the priority for service, when it is checked that the change of state is detected.

BRIEF DESCRIPTION OF THE DRAWINGS

The above and other aspects, features and advantages of the present invention will become apparent from the following description of exemplary embodiments in conjunction with the accompanying drawings, in which:

FIG. 4 is a table showing priority consistent with an embodiment of the present invention.

DETAILED DESCRIPTION OF THE INVENTION

Hereinafter, exemplary embodiments of the present invention will be described in detail with reference to the accompanying drawings.

Figure 1:
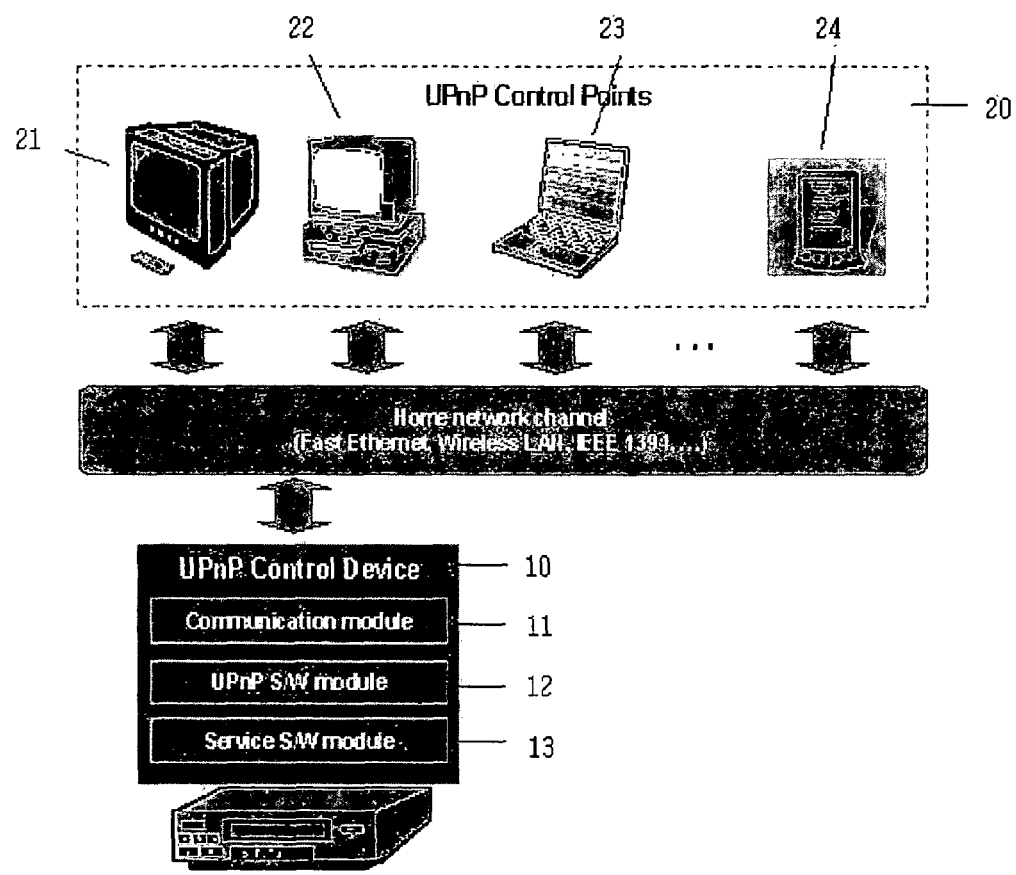
FIG. 1 is a diagram schematically illustrating the configuration of a related art UPnP system.
Figure 2:
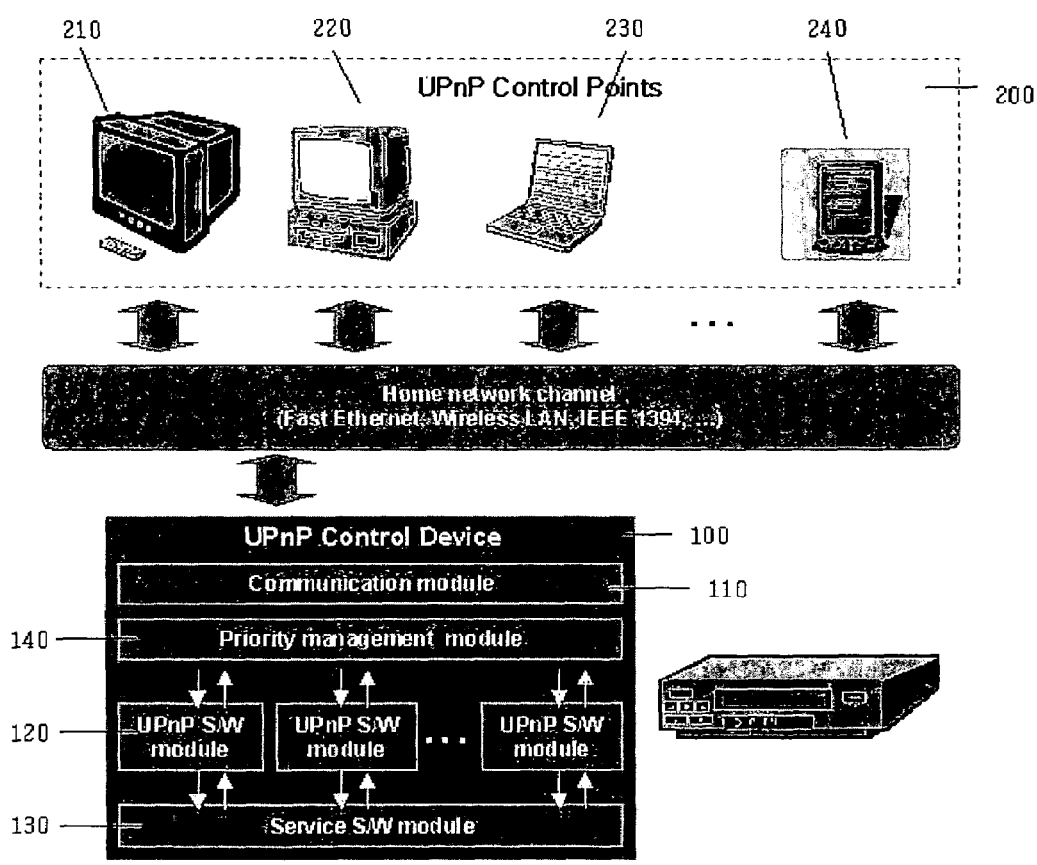
FIG. 2 is a diagram schematically illustrating a network system of the present invention for enabling service support according to quality of service (QoS)

FIG. 2 is a diagram schematically illustrating a network system for enabling QoS-based service support consistent with the present invention. The network system comprises a control device 100 and a control point 200. The control device 100 comprises a communication S/W module 110, an UPnP S/W module 120, a service S/W module 130 and a priority management module 140.

The control device 100 assigns priority for service based on the QoS for each of the control points 200 residing on a network and provides appropriate services consistent with the assigned priority.

The communication S/W module 110 receives a control message transmitted from the control point 200 or transmits a reply message to the control point 200.

Figure 3:
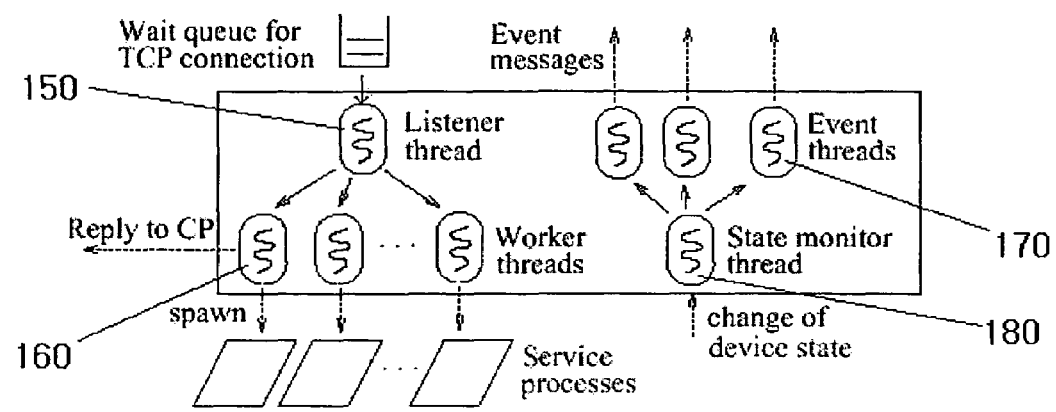
FIG. 3 is a diagram schematically illustrating the software architecture for a network device consistent with the present invention.

The priority management module 140 determines the priority for service according to the QoS level for the control points 200. As shown in FIG. 3, the priority management module 140 comprises a listener 150 for determining the priority for service according to the QoS level for the control point 200 when the communication S/W module 110 receives a control message. In the meantime, the QoS level of the control point 200 may be fixedly defined by a user or determined by the control point 200. The QoS level is again converted into an appropriate priority by an internal algorithm of the priority management module 140. In this way, the priority for each control point 200 may be assigned differently from one another, and it is common that the higher the QoS level for each control point 200, the higher priority it will be assigned thereto.

The UPnP S/W module 120 analyzes the control message received from the communication S/W module 110 and controls service operations in response to the analyzed control message. Here, the UPnP S/W module 120 comprises a worker 160 for analyzing the control message transmitted from the control point 200 and activating the appropriate services, a state monitor 180 for checking a change of state of the control device 100, and an event 170 for notifying the change of state checked by the state monitor 180 to the control point 200. The configuration of the UPnP S/W module 120 will be described in detail with reference to FIG. 3.

Further, the UPnP S/W module 120 is divided according to the service execution unit, which in turn refers to the process or thread executed by each of the execution units (for example, listener, worker, event, state monitor). Each of the execution units is assigned a priority by the priority management module 140. Specifically, appropriate services corresponding to the command messages transmitted by the plurality of control points 200 will be provided according to the priority assigned by the priority management module 140. This will be described in detail below with reference to FIG. 4.

The service S/W module 130 performs predetermined operations under the control of the UPnP S/W module 120. For example, if the UPnP S/W module 120 activates a service S/W module called "screen display", the service S/W module 130 operates to display the screen of the relevant control device.

The control point 200 is configured to control the operations of the devices residing on a network, including, for example, a digital TV 210, a personal computer 220, a notebook computer 230, a PDA 240, and the like. Each of the control points 200 has a QoS that is fixedly defined by a user or specified by an internal algorithm of the control point 200.

FIG. 3 is a diagram schematically illustrating the software architecture for a network device consistent with the present invention, including a listener 150, a worker 160, an event 170, and a state monitor 180.

The listener 150 waits for control messages from the control point 200 and determines the priority based on the QoS level for the control point 200 when the control messages have been received.

The worker 160 analyzes messages involved with a connection request transmitted from the control point 200 and activates the service S/W module 130 responsible for service provision.

The state monitor 180 monitors the change of state of the control device 100 and issues an event 170 when the state has been changed. For example, a change of state means that the operating state of the control device 100 is changed from "playback" to "stop" or from "recording reserved" to "recording started".

The event 170 transfers the change of state of the control device to the control point 200 and may be executed with different priorities according to the QoS level for the control point 200 in the same manner as in the worker 160. In other words, the change of state of the control device is transferred preferentially to the higher-priority control points 200.

In the meantime, consistent with the present invention, interruptions due to the UPnP communications and control from the other associated control points 200 can be minimized by assigning higher-priority execution units (processes or tasks) to the control points 200 requiring a higher QoS level.

FIG. 4 is a table representing priority consistent with an embodiment of the present invention. Herein, a priority of 10 is the highest priority, and a priority of 1 is the lowest priority.

As shown in this figure, the listener 150 is assigned a priority of 10 (the highest priority), since it functions to perform the TCP connection and to determine the priority. In other words, if control commands are transferred to the control device 100, the listener 150 determines the priority of the device. Thus, the highest priority should be assigned to the listener 150 since each service is performed according to the priority assigned by the listener 150.

The state monitor 180 detects the change of state of the control device 100 and creates an event when the change of state of the control device 100 has been detected. Thus, the priority of 10 (the highest priority) should also be assigned to the state monitor 180. The reason is that when the state of the control device is changed during its operation, information on the change of state of the control device should be sent to the control point 200.

The worker 160 analyzes the control messages transmitted from the control point 200, and the event 170 notifies the control point 200 of the event generated by the state monitor 180. Further, a service process performs service operations corresponding to the control messages analyzed by the worker 160 and thus is assigned any one of priorities of 2 to 9 that is lower than that of the listener 150 or state monitor 180.

Figure 5:
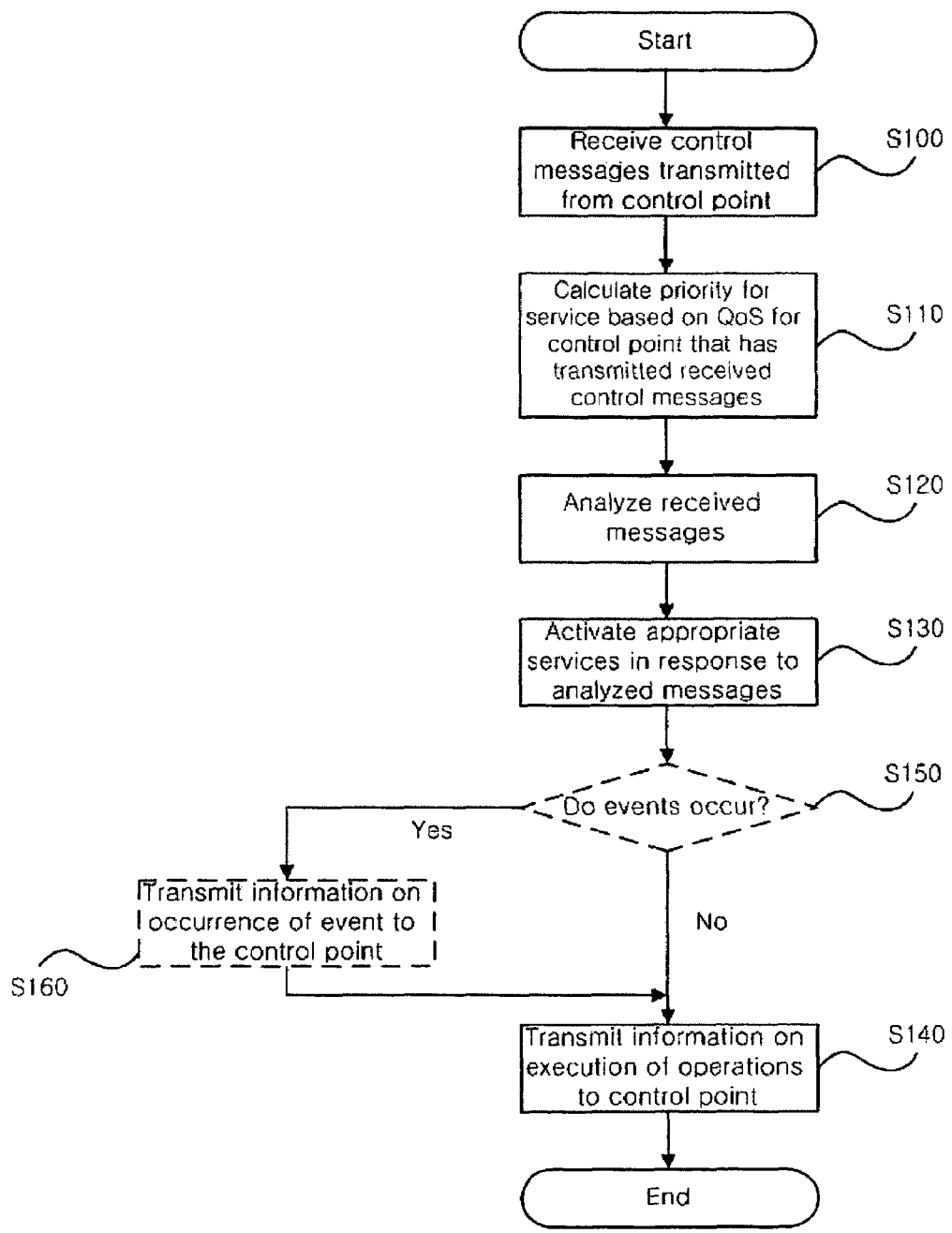
FIG. 5 is a flowchart schematically illustrating a method for enabling QoS-based service support consistent with the present invention.

FIG. 5 is a flowchart schematically illustrating the process of enabling the QoS-based service support consistent with the present invention. First, when the control point 200 transmits control messages to the control device 100, the communication S/W module 110 of the control device 100 receives the control messages transmitted from the control point 200 (S100).

Then, the priority management module 140 determines the priority based on the QoS level for the control point 200 that has transmitted the control messages (S110). Herein, the QoS level for the control point 200 may be fixedly defined by a user or determined dynamically by the control point 200, and the priority is determined using a mapped table in which the QoS for each control point defined by the user is stored. That is, when the control point transmits control messages, the priority management module 140 is preferentially activated to retrieve the QoS level for the relevant control point 200 from the mapped table and to determine its priority. The mapped table corresponds to a table in which the QoS for each control point 200, which is assigned by the internal algorithm of the control point 200, is stored.

The UPnP S/W module 120, which has been selected according to the priority determined by the priority management module 140, analyzes the received control messages (S120) so that appropriate service operations can be accordingly performed (S130). That is, the worker 160 of the UPnP S/W module 120 analyzes which services are requested based on the control messages transmitted by the control point 200 so that appropriate services are performed accordingly.

Thereafter, the UPnP S/W module 120 creates a reply message for notifying that the services requested by the control point 200 are being normally processed and transmits the created reply message to the relevant control point 200 (S140).

In the meantime, if the state of the control device 100 is changed while performing the services requested by the control point 200, the UPnP S/W module 120 creates an event and transmits the information on the change of state to the control point 200 (S160). At this time, the information on the change of state is transmitted according to the already set priority of the control point 200. The reason is that the information on the change of state of the control device 100 should be preferentially notified to the higher-priority control point 200 so that the higher-priority control point 200 can first control the control device 100.

An exemplary embodiment of the method of enabling QoS-based service support consistent with the present invention will now be explained by way of example. It is assumed that a control device 100 such as a set-top box ("STB") and three control points CP1, CP2 and CP3 are provided. In this context, CP1 is executed in a PDA and allows the STB to receive a specific broadcast program and stream the received program to the digital TV connected thereto. CP2 is run in a PC and allows the STB to stream the stored broadcast program to the PC over a wireless LAN. CP3 is operating in the STB and allows the STB to record the scheduled broadcast program.

Meanwhile, the control points CP1, CP2 and CP3 are in a state where their QoS levels are already assigned. Further, if messages are transmitted from the control points 200, relevant services are provided according to the priority corresponding to the assigned QoS level for each control point. The QoS level for each of the control points CP1, CP2 and CP3 may be either fixedly defined by a user and stored in the mapped table, or assigned by internal algorithm of the control point 200. Priority is determined based on the QoS level that is defined in the mapped table.

For example, it is assumed that the QoS level for CP1 is set to 1, the QoS level for CP2 is set to 3, and the QoS level for CP3 is set to 2. At this time, the QoS level of 1 is the best quality of service and corresponds to a case where interruptions do not occur during the playback of the screen and the delay time needed for controlling the STB is less than 1 second. The QoS level of 2 is an intermediate quality of service and corresponds to a case where interruptions do not occur but the delay time needed for controlling the STB is greater than 1 second. The QoS level of 3 is a lower quality of service and corresponds to a case where interruptions may occur and the delay time needed for the control of the STB may be greater than 1 second.

First, if CP2 transmits a control message called "start playing" to the STB, the communication S/W module 110 of the STB receives the control messages transmitted from the CP2.

Then, the priority management module 140 retrieves the QoS level for CP2 that has transmitted the control message. That is, the QoS level for CP2 stored in the mapped table is retrieved and the priority is determined based on the retrieved QoS level. Subsequently, if it is determined from the retrieval that the QoS level for CP2 is 3, priority is determined accordingly (for example, "3").

Then, the priority management module 140 transmits the determined value to the UPnP S/W module 120 so that the control message transmitted from CP2 can be processed with the priority of 3.

The UPnP S/W module 120 executes the worker 160 to interpret the transmitted message. That is, the UPnP S/W module 120 parses the control message and analyzes whether the transmitted control command is a message for requesting the "start playing", and then executes the service operations corresponding to the analyzed message with the priority of 3.

Then, the UPnP S/W module 120 verifies that the playingback begins, creates a reply message notifying that the control commands have been processed normally, and transmits the reply message to CP2.

In the meanwhile, if the state of the control device 100 is changed during the execution of the control commands from CP2, the state monitor 180 detects the change of state of the control device 100, creates an event in response to the detected change of state, and transmits the information on the change of state of the control device 100 to the control points CP1, CP2 and CP3.

Consistent with the present invention, there is an advantage in that priority for service is assigned according to the quality of service (QoS) for the control point and the services are provided according to the assigned priority so that the delay time due to contentions between a plurality of UPnP control points can be reduced.

Further, due to reduction of the contentions between the plurality of UPnP control points, degradation of QoS, delay in processing time and the like can be prevented. Therefore, there is another advantage in that the best service can be provided to a user.

Although the present invention has been described in detail in connection with the exemplary embodiments thereof, those skilled in the art will appreciate that various modifications, substitutions and changes to the invention may be made without departing from the spirit and scope of the present invention as disclosed in the appended claims. Therefore, it will be apparent that simple changes to the embodiments set forth above fall within the technical scope of the present invention.

What is claimed is:

1. A network device, comprising:
   a control device operable to assign a priority for service based on quality of service (QoS) for each control point residing on a network and services are provided by the control device according to the assigned priority; and
   a plurality of execution units, each execution unit being assigned an execution priority, which analyze control messages transmitted from the control points according to the assigned execution priority,
   wherein the execution priority is assigned to each execution unit according to a specific function which each execution unit performs with respect to a control message among the control messages;
   wherein the plurality of execution units comprise:
   a listener unit which determines the priority for service;
   a state monitor unit which detects if a change of state occurs in the control device; and
   an event unit which transfers a message indicating the change of state to the control point.

2. The network device as claimed in claim 1, comprising:
   a communication S/W module which receives the control messages transmitted from the control points or transmits reply messages to the control points;
   a priority management module which determines the priority for service based on a QoS level for each control point;
   a Universal Plug and Play (UPnP) Software (S/W) module which analyzes the control messages received from the communication S/W module and controls service operations corresponding to the analyzed control messages; and
   a service S/W module which performs the service operations under the control of the UPnP S/W module.

3. The network device as claimed in claim 2, wherein the priority management module determines the priority for service using a mapped table in which the QoS is stored for each control point.

4. The network device as claimed in claim 2, wherein the UPnP S/W module checks a change of state of the network device to be controlled and creates an event in response to the checked result.

5. The network device as claimed in claim 2, wherein the UPnP S/W module is divided according to an execution unit.

6. The network device according to claim 1, wherein the execution priority assigned to the listener unit is higher than the execution priority assigned to the state monitor unit and the event unit.

7. A network system for enabling service support according to quality of service (QoS), comprising:
   a control point operable to control the operations of devices residing on a network;
   a control device operable to assign a priority for service according to the QoS for each control point and operable to provide services according to the assigned priority for service; and
   a plurality of execution units, each execution unit being assigned an execution priority, which analyze control messages transmitted from the control points according to the assigned execution priority,
   wherein the execution priority is assigned to each execution unit according to a specific function which each execution unit performs with respect to a control message among the control messages;
   wherein the plurality of execution units comprise:
   a listener unit which determines the priority for service;
   a state monitor unit which detects if a change of state occurs in the control device; and
   an event unit which transfers a message indicating the change of state to the control point.

8. The network system according to claim 7, wherein the execution priority assigned to the listener unit is higher than the execution priority assigned to the state monitor unit and the event unit.

9. A method for enabling service support according to quality of service (QoS), comprising:
- receiving, by a control device, a control message transmitted from a control point;
- determining, by the control device, a priority for service based on a QoS level for the control point that has transmitted the received control message; and
- providing relevant services, by the control device, according to the determined priority for service;
- wherein the determining comprises:
- assigning an execution priority to each of a plurality of execution units; and
- analyzing the control message, by the plurality of execution units, according to the assigned execution priority,
- wherein the execution priority is assigned to each execution unit according to a specific function which each execution unit performs with respect to the control message;
- wherein the analyzing of the control message comprises:
- determining, by a listener unit of the plurality of execution units, the priority for service when the control message is received;
- detecting, by a state monitor unit of the plurality of execution units, if a change of state occurs in the control device; and
- transferring, by an event unit of the plurality of execution units, a message indicating the change of state to the control point,
- wherein the execution priority assigned to the listener unit is higher than the execution priority assigned to the state monitor unit and the event unit.

10. The method as claimed in claim 9, wherein determining a priority for service based on a QoS level for the control point that has transmitted the received control message comprises determining the priority for service using a mapped table in which the QoS is stored for each control point.

11. The method as claimed in claim 9, wherein providing relevant services according to the determined priority for service comprises:
- analyzing the control message transmitted from the control point; and
- activating services corresponding to the analyzed message according to the priority for service.

12. The method as claimed in claim 9, further comprising:
- checking a change of state of the control device; and
- notifying the control point of information on the state of the detected control device according to the priority for service, when it is checked that the change of state is detected.

13. A method for enabling service support according to quality of service (QoS), comprising:
- transmitting a control message to a control device by a control point;
- determining, by the control device, a priority for service based on a QoS level for the control point that has transmitted the received control message; and
- providing relevant services, by the control device, according to the determined priority for service;
- wherein the determining comprises:
- assigning an execution priority to each of a plurality of execution units; and
- analyzing the control message, by the plurality of execution units, according to the assigned execution priority,
- wherein the execution priority is assigned to each execution unit according to a specific function which each execution unit performs with respect to the control message;
- wherein the analyzing of the control message comprises:
- determining, by a listener unit of the plurality of execution units, the priority for service when the control message is received;
- detecting, by a state monitor unit of the plurality of execution units, if a change of state occurs in the control device; and
- transferring, by an event unit of the plurality of execution units, a message indicating the change of state to the control point,
- wherein the execution priority assigned to the listener unit is higher than the execution priority assigned to the state monitor unit and the event unit.

14. The method as claimed in claim 13, wherein determining a priority for service based on a QoS level for the control point that has transmitted the received control message comprises determining the priority for service using a mapped table in which the QoS is stored for each control point.

15. The method as claimed in claim 13, wherein providing relevant services according to the determined priority for service comprises:
- analyzing the control message transmitted from the control point; and
- activating services corresponding to the analyzed message according to the priority for service.

16. The method as claimed in claim 13, further comprising:
- checking a change of state of the control device; and
- notifying the control point of information on the state of the detected control device according to the priority for service, when it is checked that the change of state is detected.

* * * * *